United States Patent [19]
Larsen

[11] 4,224,876
[45] Sep. 30, 1980

[54] CUP-SHAPED BOLSTER BEARING

[75] Inventor: Glen D. Larsen, Upper Marlboro, Md.

[73] Assignee: Southern Railway Company, Washington, D.C.

[21] Appl. No.: 950,680

[22] Filed: Oct. 12, 1978

[51] Int. Cl.$^2$ .......................... B61F 5/16; B61F 5/18; F16C 17/04

[52] U.S. Cl. .............................. 105/199 C; 105/200; 308/137

[58] Field of Search ................. 105/199 C, 200; 308/137

[56] References Cited

U.S. PATENT DOCUMENTS

| Re. 28,279 | 12/1974 | Robertson | 105/199 C |
|---|---|---|---|
| 641,165 | 1/1900 | Street | 308/137 |
| 1,147,210 | 7/1915 | Coleman | 308/137 |
| 1,453,661 | 5/1923 | Dath | 308/137 |
| 1,770,982 | 7/1930 | Jacobs | 308/137 |
| 2,258,640 | 10/1941 | Beckette | 308/137 |
| 2,557,619 | 6/1951 | Swart | 308/174 X |
| 3,170,740 | 2/1965 | Smith | 308/137 |
| 3,218,989 | 11/1965 | Kreiner et al. | 105/200 |
| 3,326,611 | 6/1967 | Christian | 308/137 |
| 3,405,654 | 10/1968 | Dilg | 308/137 |
| 3,667,820 | 6/1972 | Sherrick | 308/137 |
| 3,713,710 | 1/1973 | Wallace | 308/137 |
| 3,771,465 | 11/1973 | Glenn | 105/199 C |
| 3,831,530 | 8/1974 | Cope et al. | 105/199 C |
| 3,859,928 | 1/1975 | Adler | 105/199 C |
| 3,944,298 | 3/1976 | Cannon | 308/137 |
| 3,986,752 | 10/1976 | Bogar et al. | 308/137 |

Primary Examiner—Howard Beltran
Attorney, Agent, or Firm—Watson, Cole, Grindle & Watson

[57] ABSTRACT

A bolster bearing having a flat bottom wall and an annular sidewall is disposed in the bolster bowl of a truck bolster, a radially extending annular flange on the bearing sidewall overlying an upper surface of the upstanding rim of the truck bolster defining its bolster bowl. Cooperating elements on the rim and on the bearing flange prevent rotation of the bearing from a first position relative to the bolster bowl. The bearing may be radially shifted from its first position to a second position upon disengagement of such elements followed by a reengagement of such elements at such second position in which the bearing is likewise prevented from rotation relative to the bolster bowl.

5 Claims, 6 Drawing Figures

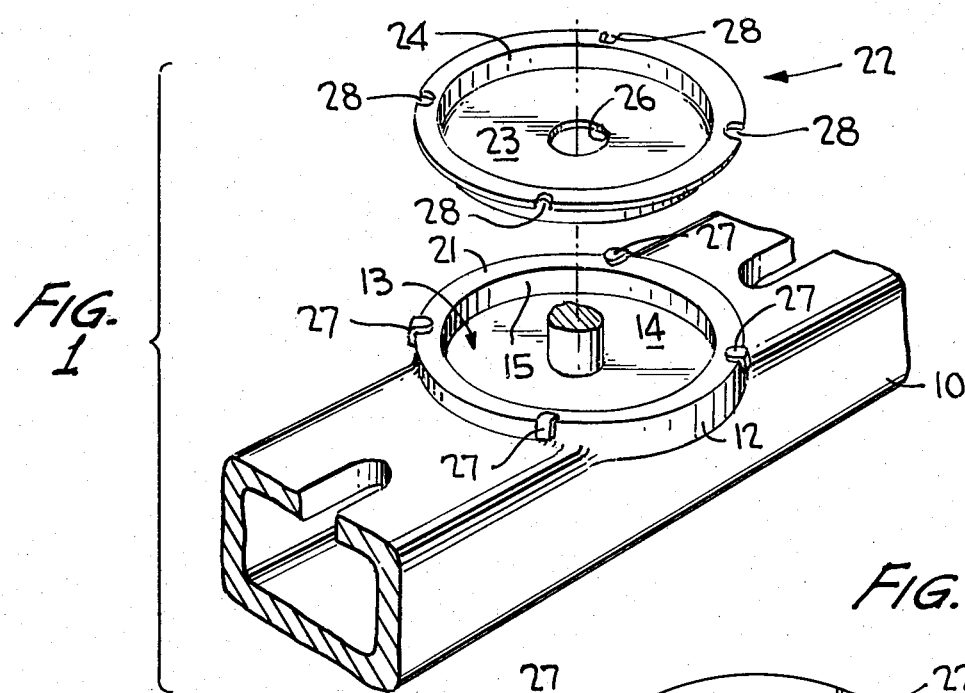
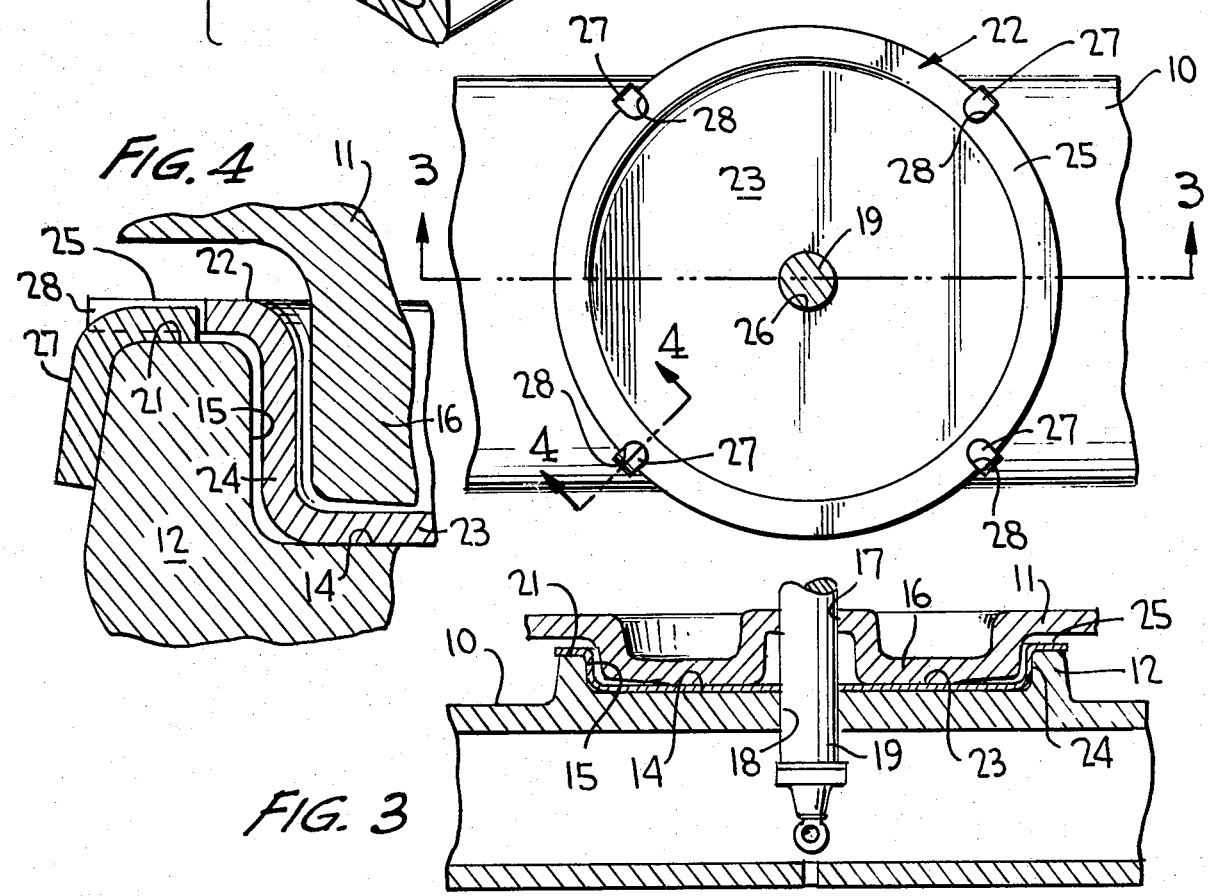

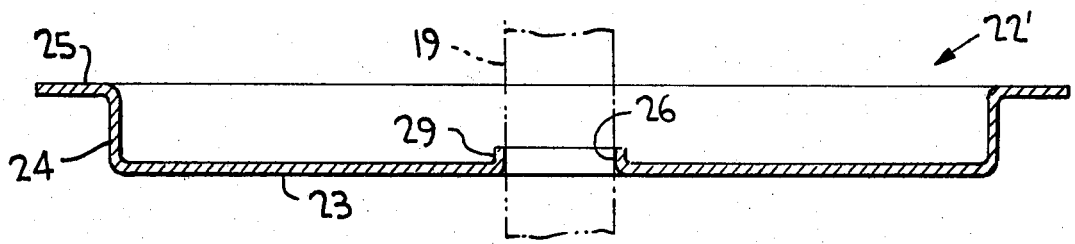
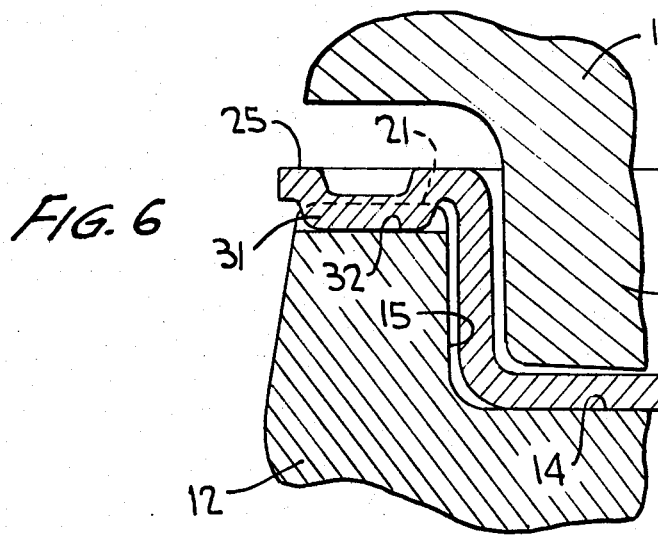

CUP-SHAPED BOLSTER BEARING

BACKGROUND OF THE INVENTION

This invention relates generally to a bolster bearing or liner disposed between the bolster bowl of a truck bolster and the center plate of a car body bolster, and more particularly to a cup-shaped bearing engaged with the truck bolster against rotation in a first position as well as in a second position radially shifted relative thereto.

As is well known the center plate of a rail car body has a cylindrical boss which mates with a cylindrical socket forming a bolster bowl in the truck bolster which forms part of the car body underframe. A king pin extends through centrally aligned openings in the body bolster, center plate and bolster bowl about which the truck bolster may rotate relative to the car body. The cast bolster bowls are known to rapidly wear since the weight of the car body is transmitted to the truck bolster via the center plate and mating bolster bowl thereby developing considerable friction at such engaged surfaces. The center plate will likewise become worn in service and must therefore be periodically replaced. Although replacement of the center plate is relatively easy excessive wear of the bolster bowl rendering the truck bolster unserviceable requires a complete diassembly of the car truck for replacement.

Hardened steel liners are typically inserted between the mating surfaces of the center plate and bolster bowl for minimizing the aforedescribed wear problems. These liners normally include a circular plate fitted into the bottom of the bowl and an annular wear ring extending around the side of the bowl. The wear ring is normally secured in place to the truck bolster by means of a joint weld between the ring and the rim of the bolster bowl. However, due to extremely rough handling during the service life of the rail car and because of the inherently weak welds developed in joining different steels together, i.e., the wear ring, usually of manganese steel, with the bolster bowl, usually a cast mild steel, the weld joints crack and fail to properly retain the ring in place. Moreover, by the very nature of manganese steel material, the wearing undergoes grain growth (creep) while being work-hardened in service, likewise causing the welds to develop incipient cracks, leading to ultimate failure.

An attempt in avoiding the problem of securely retaining a hardened liner in a bolster bowl of a rail car truck bolster is disclosed in U.S. Pat. No. 3,713,710 wherein a retainer plate overlaps the wear ring and is welded to only the truck bolster. Such retainer plate is formed of a steel which is, from a welding standpoint, compatible with the steel from which the truck bolster is formed so as to hopefully avoid weld locations subjected to high stress concentrations when the rail car experiences severe impacts, and to likewise avoid the problem of weak welds when joining two different steels. The wear ring is alternatively held in place by a tongue and groove arrangement, by a press fit arrangement, or by welding the ring at opposite ends to the rim of the bolster bowl and to the bottom wear plate.

Such prior art arrangements nevertheless fail to effectively avoid the problems caused by weakened weld joints especially when the hardened steel liner undergoes creep while being work-hardened in service. And, in the prior art arrangement whereby the wear ring and wear plate are interconnected by welding and the wear ring is welded to the bolster bowl rim, failure of the weld joint between the ring and rim may allow relative rotation between the wear plate and the bolster bowl thereby causing excessive bolster bowl wear and bringing about the need for costly and tedious replacement thereof.

Another problem not solved by the prior art arrangements concerns that of uneven wear of the liner in a longitudinal or in a transverse direction relative to car movement. It would be advantageous to rotate the liners through 90° so as to expose unworn surfaces thereof to the center plate depending on whether the principle wear of the liners occurs longitudinally or transversely. However, because the prior art wear liners are welded in place to the truck bolster, they are obviously incapable of being rotated for such purpose.

SUMMARY OF THE INVENTION

It is therefore an object of the present invention to avoid the problems inherent in the prior art arrangements in failing to effectively maintain hardened steel liners securely in place in the bolster bowls of a rail car truck bolster, while at the same time permitting the liner to be shifted relative to the center plate in the event of uneven liner wear, and be securely retained in such a shifted position.

Another object of this invention is to provide a cup-shaped bolster bearing or liner for the reception in the bolster bowl of a truck bolster with a slightly loose fit so as to permit the bearing to radially expand as it undergoes creep while being work-hardened in service.

A further object of the present invention is to provide such a bearing which is positively secured in place against rotation relative to the truck bolster but without the use of weld joints of any type, yet is permitted to be rotated 90°, and securely retained in such rotated position, in the event of the principle liner wear occurring longitudinally or transversely of the direction of car movement.

In carrying out the invention, the bolster bearing includes a flat bottom wall, an annular sidewall and an annular flange extending radially outwardly of the sidewall. The bearing is fitted within the bolster bowl of a truck bolster having a flat bottom wall and a cylindrical wall. An upper surface of a cylindrical rim containing the cylindrical wall has, according to one embodiment, spaced lugs extending upwardly thereof, and the annular flange of the bearing overlies this upper surface and has spaced slots therein in engagement with the lugs for maintaining the bearing in place in a first position against rotation relative to the truck bolster. Four lugs and slots are spaced 90° apart so that the bearing may be lifted, rotated 90° and replaced without relative rotation for another cycle of service. The bottom wall of the bolster bearing may have an upstanding annular flange or lip surrounding the central opening thereof which accommodates the king pin, such flange serving to promote flatness and prevent buckling of the flat bolster bearing bottom wall. And, the annular wall of the bearing is spaced slightly inwardly of the bolster bowl cylindrical wall to allow the bearing to slightly expand as it work-hardens.

In accordance with another embodiment, spaced lugs are instead provided on the annular flange in engagement with depressions located in the rim for preventing relative rotation of the bearing in its first and second positions.

Other objects, advantages and novel features of the invention will become more apparent from the following detailed description of the invention when taken in conjunction with the accompanying drawings.

BRIEF DESCRIPTION OF THE DRAWINGS

FIG. 1 is a perspective and expanded view of the bolster bearing of the present invention shown relative to the bolster bowl of a truck bolster;

FIG. 2 is a top plan view at a slightly enlarged scale of the bolster bearing fitted in the bolster bowl;

FIG. 3 is a sectional view taken substantially along line 3—3 of FIG. 2 and further showing a center plate of the car body bolster in engagement with the bolster bearing;

FIG. 4 is a sectional view at a slightly enlarged scale taken substantially along line 4—4 of FIG. 2 and further showing a portion of the center plate;

FIG. 5 is a sectional view similar to FIG. 3 but at a slightly enlarged scale showing a modified bolster bearing according to the invention; and FIG. 6 is a view similar to FIG. 4 showing another embodiment of the invention.

DETAILED DESCRIPTION OF THE INVENTION

Turning now to the drawings wherein like reference numerals refer to like and corresponding parts throughout the several views, a typical rail car truck bolster 10 is shown in part in FIGS. 1 and 2. The truck bolster extends transversely of the rail car, comprises part of the rail car truck and is the portion of the car truck on which the car body rests The truck bolster underlies and is engaged with a car body bolster (not shown) having a center plate 11 of typical construction mounted in any normal manner to the underside thereof. An upwardly projecting annular rim 12 is cast integrally with the center section of the truck bolster, the rim defining the periphery of an upwardly opening bolster bowl 13 having a flat bottom wall 14 and an inner cylindrical sidewall 15.

Center plate 11, which is fastened to the car body bolster (not shown), includes a cylindrical boss 16 which fits into bolster bowl 13. The axial depth of boss 16 is greater than the depth of the bolster bowl so that the car body bolster is elevated relative to the truck bolster. Aligned central bores 17 and 18 are respectively provided in boss 16 and in the truck bolster through which a king pin 19 extends as in any normal manner.

An upper annular surface 21 of rim 12, sidewall 15 and bottom wall 14 of the bolster bowl are trimmed by machining these surfaces so that a standard truck bolster may accommodate a bolster bearing or liner 22 according to the invention. The bolster bearing has a flat bottom wall 23 which rests flatly against bottom wall 14 of the bolster bowl, and has an annular sidewall 24 of cylindrical shape formed integrally with and extending upwardly from bottom wall 23. The bolster bearing further has an annular flange 25 extending radially outwardly of sidewall 24 and overlying upper surface 21 of rim 12.

During assembly, cylindrical boss 16 of center plate 11 is guided into bolster bowl 13 on truck bolster 10. When so fitted, the bottom surface of the cylindrical boss rests on bottom wall 23 of the bolster bearing, as in FIG. 3, so that the weight of the car body is transferred to the truck through bolster bearing 22. A central bore 26 is provided in the bolster bearing co-axial with bores 17 and 18 so as to accommodate king pin 19.

In accordance with one embodiment, lug means comprising lugs or clips 27 are welded to rim 12 so as to project upwardly of upper surface 21 thereof. A plurality of four lugs are provided and are equally spaced 90° apart. It should be pointed out that these lugs 27 are welded in place on existing truck bolsters having its bowl surfaces trimmed as aforedescribed for accommodating the invention, or lugs projecting upwardly of surface 21 are cast into the truck bolster casting for new work.

Flange 25 of the bolster bearing is provided with four slots 28 likewise equally spaced 90° apart and opening into the peripheral edge of the flange as shown. The slots are dimensioned for snuggly embracing those portions of the lugs extending upwardly of surface 21, so that when the slots are in engagement with such lug portions, the bolster bearing is retained in place within the bolster bowl against rotation relative thereto. Thus, the cup-shaped bolster bearing 22, formed of hard steel such as manganese steel, experiences relatively little wear as center plate 11 rotates relative thereto during car movement. Any wear is therefore confined to the center plate which is more easily replaced as compared to the truck bolster or its bolster bowl.

According to another embodiment of the invention, flange 25 of the bolster bearing is instead provided with four depending lugs 31 equally spaced 90° apart, and surface 21 of rim 12 has a corresponding member of equally spaced depressions or open grooves 32 located therein for engagement with lugs 31. The dimensions of depressions 32 and grooves 32 are such as to permit a snug engagement therebetween, whereby the bolster bearing is retained in place within the bolster bowl against relative rotation. It should be noted that lugs 31 may be formed in any well known manner as by upsetting the material of flange 25.

Despite the relatively little wear of the bolster bearing, it has been found that the principle wear thereof occurs either longitudinally in the direction of car movement, as shown by the arrow in FIG. 2, or occurs transversely thereto. If the wear occurring in either the longitudinal or in the transverse direction becomes excessive and persists, the effectiveness of the bolster cup is reduced and must therefore be replaced. The present invention avoids the need for replacement of the bolster cup under such circumstances. For example, if the principle wear of cup 22 occurs in a longitudinal direction along the arrow of FIG. 2, the car body bolster may be elevated so as to raise center plate 11 out of the bolster bowl whereupon cup 22 may be lifted and rotated 90° in either direction and lowered back into place so that slots 28 again engage with lugs 27, or so that lugs 31 again engage with depressions 32. Thus, after the car body bolster and its center plate are lowered back into place, unworn surfaces of the bolster cup are presented to the undersurface of the center plate. Of course, if the principle wear of the bolster cup occurs in a transverse direction, the cup may be similarly lifted and turned 90° so as to present unworn surfaces to the undersurface of the center plate. The bolster cup may therefore be used for two cycles of service before it needs to be replaced, and is retained by the anti-rotation lugs 27 or 31 in its intended position during the first and the second cycle of service without any possibility of rotating relative to the truck bolster.

The hardened steel bolster bearing or cup according to the invention contains a predetermined percentage of manganese steel, and may be formed by a hot die-press operation after which it is heat-treated and then sized in a final die.

A modified bolster bearing or cup 22' is shown in FIG. 5 which is identical to bearing 22 except that it is provided with a short upstanding annular flange 29 surrounding bore 26. This raised edge or flange promotes the flatness of flat bottom wall 23 of the cup and effectively prevents it from buckling before and after installation between the car body bolster and the truck bolster. Also, annular flange 25 of both bearings 22 and 22' provide dimensional stability for the bearings and produce, together with flange 29 of cup 22', necessary structural strength to resist the lateral and longitudinal forces which develop during car movement over-the-road.

Also, as shown in FIGS. 4 and 6 of the drawings, sidewall 24 of the bolster bearing is initially spaced slightly inwardly of sidewall 15 of rim 12 of the bolster bowl. With such an arrangement, and because the bolster cup is totally unrestrained by any welding to the truck bolster, it is free to slightly expand radially in its machined recess as it work-hardens. As pointed out earlier, the bolster cup undergoes grain growth (creep) while being work-hardened in service, because of the very nature of the manganese steel material of which it is made.

From the foregoing it can be seen that a unique bolster bearing or liner of cup-shape has been designed and avoids many of the problems of the prior art bolster liners and bearings wherein the weld joints between the bearing and the truck bolster are known to fail so as to defeat the purpose for which the bearing is intended. The bearing according to the invention is retained in place by means of anti-rotation lugs located on the rim of the bolster bowl, and is totally unrestrained by welding so that it may slightly expand in its machined recess as it work-hardens. And, the bolster cup of the invention is structurally rigid because of its design, and may be utilized for at least two cycles of service in the event of excessive wear confined along a single direction.

Obviously, many other modifications and variations of the present invention are made possible in the light of the above teachings. It is therefore to be understood that within the scope of the appended claims, the invention may be practiced otherwise than as specifically described.

I claim:

1. In a center plate of a rail car body having a cylindrical boss mating with a cylindrical socket forming a bolster bowl in a truck bolster, the bolster bowl having a flat bottom wall and an upwardly projecting annular rim having an upper annular surface, a king pin extending through centrally aligned openings in the body bolster, the center plate and the bolster bowl about which the truck bolster may rotate relative to the car body, an annular bolster bearing of hardened steel concentric with the center plate and the bolster bowl, the bolster bearing having an annular sidewall lying between the cylindrical boss and the inner surface of the annular rim, lateral and longitudinal forces which develop between the center plate and the bolster bowl during car movement typically being exerted against said annular sidewall by impacting, the improvement wherein said bolster bearing is provided with means for structurally reinforcing said annular sidewall to withstand said forces, said means comprising an annular flange integrally connected with said sidewall at a terminal end thereof, said flange lying parallel to said annular base and fully overlying said upper annular surface of said annular rim, and said base, said sidewall and said flange of said bearing being of substantially the same gauge thickness, whereby said annular flange provides structural stability for said bolster bearing and produces the necessary structural strength for said bearing to resist the lateral and longitudinal forces which develop during car movement over-the-road.

2. In the center plate according to claim 1, further comprising cooperating means on said upper surface of said rim and on said flange for inhibiting rotation of said bolster bearing relative to said bolster bowl about a central axis of said bearing, whereby bolster bowl wear is minimized during relative movement between the car body and said truck bolster.

3. In the center plate according to claim 2, wherein said cooperating means comprise lug means on said flange and depressions in said rim.

4. In the center plate according to claim 3, wherein said lug means comprise a plurality of lugs, said depressions and said lugs being radially spaced apart equally, whereby rotation of said bearing from a first position about said central axis relative to said bolster bowl is inhibited upon interengagement of said cooperating means, and whereby said bearing may be radially shifted about said axis from said first position into a second position in which said bearing is likewise inhibited from rotating relative to said bolster bowl.

5. In the center plate according to claim 1, wherein said sidewall of said bearing is spaced slightly inwardly of said inner surface of said rim to permit said bearing to expand radially when undergoing creep while being work-hardened in service.

* * * * *